US009538559B2

(12) United States Patent
Choiniere et al.

(10) Patent No.: US 9,538,559 B2
(45) Date of Patent: Jan. 3, 2017

(54) FACILITATING RADIO COMMUNICATION USING TARGETING DEVICES

(71) Applicant: BAE Systems Information and Electronic Systems Integration Inc., Nashua, NH (US)

(72) Inventors: Michael J. Choiniere, Merrimack, NH (US); Mark P. Devins, Nashua, NH (US); David A. Richards, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/763,629

(22) PCT Filed: Oct. 1, 2014

(86) PCT No.: PCT/US2014/058513
§ 371 (c)(1),
(2) Date: Jul. 27, 2015

(87) PCT Pub. No.: WO2015/080800
PCT Pub. Date: Jun. 4, 2015

(65) Prior Publication Data
US 2015/0359012 A1  Dec. 10, 2015

Related U.S. Application Data

(60) Provisional application No. 61/909,799, filed on Nov. 27, 2013.

(51) Int. Cl.
*H04W 76/00* (2009.01)
*H04W 4/10* (2009.01)
*F41G 3/00* (2006.01)
*G01S 17/08* (2006.01)
*F41G 3/06* (2006.01)
*F41G 3/02* (2006.01)

(52) U.S. Cl.
CPC .............. *H04W 76/005* (2013.01); *F41G 3/00* (2013.01); *F41G 3/02* (2013.01); *F41G 3/06* (2013.01); *G01S 17/08* (2013.01); *H04W 4/10* (2013.01)

(58) Field of Classification Search
CPC .................................................... H04W 76/005
See application file for complete search history.

(56) References Cited

U.S. PATENT DOCUMENTS

| | | | |
|---|---|---|---|
| 5,801,866 A * | 9/1998 | Chan | H04B 10/11 398/129 |
| 6,718,044 B1 * | 4/2004 | Alleyne | A61M 21/00 381/336 |
| 2008/0201138 A1 | 8/2008 | Visser et al. | |

OTHER PUBLICATIONS

PCT/US14/058513, ISR mailed on Dec. 22, 2014.

* cited by examiner

*Primary Examiner* — Tuan H Nguyen
(74) *Attorney, Agent, or Firm* — Sand & Sebolt, LPA; Daniel J. Long

(57) ABSTRACT

A system for facilitating radio communication using targeting devices is disclosed. In one embodiment, the targeting device includes a wireless microphone. The wireless microphone is wirelessly connected to a communication device. Further, the targeting device includes an activation button to activate the communication device. In this embodiment, the wireless microphone transmits an audio signal to the communication device upon activating the communication device.

9 Claims, 1 Drawing Sheet

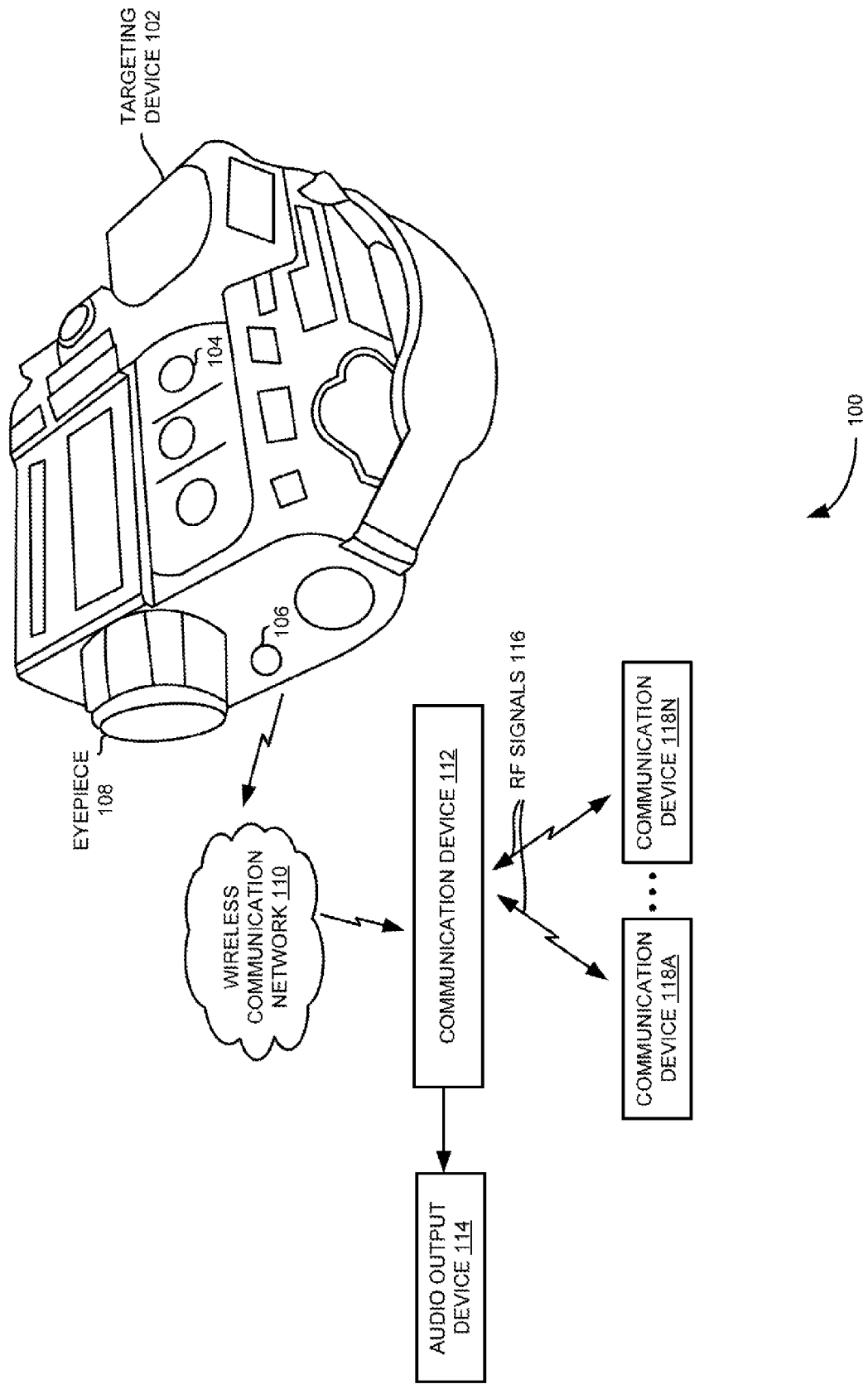

FACILITATING RADIO COMMUNICATION USING TARGETING DEVICES

CROSS-REFERENCE TO RELATED APPLICATIONS

This Application claims rights under 35 USC §119(e) from U.S. Application 61/909,799 filed Nov. 27, 2013, the contents of which are incorporated herein by reference.

BACKGROUND OF THE INVENTION

Field of the Invention

The present invention relates to radio communication and more particularly to facilitating radio communication using targeting devices.

Brief Description of Related Art

Typically, a targeting device is operated using two hands of an operator. Exemplary targeting device includes a laser targeting device, a weapon and the like. During a mission, while operating the targeting device, the operator may have to communicate with a command base and/or a weapons platform. Traditionally, this communication occurs via a two-way radio communication device. When the operator need. to communicate, the operator manually keys his radio communication device using an activation button provided on the two-way radio communication device and then relays an audio message. Consequently, the operator has to juggle the targeting device with one hand, during the mission, while keying the radio communication device. Also, the operator may lose sight of the target while keying the radio communication device.

SUMMARY OF THE INVENTION

A system for facilitating radio communication using targeting devices is disclosed. According to one aspect of the present subject matte the targeting device includes a wireless microphone. The wireless microphone is wirelessly connected to a communication device. Further, the targeting device includes an activation button to activate the communication device. In one embodiment, the wireless microphone transmits an audio signal to the communication device upon activating the communication device.

According to another aspect of the present subject matter, the system for facilitating radio communication includes a communication device and a targeting device. The targeting device includes a wireless microphone. The wireless microphone is wirelessly connected to a communication device. Further, targeting device includes an activation button to activate the communication device. In one embodiment the wireless microphone transmits an audio signal to the communication device upon activating the communication device.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

FIG. 1 illustrates an exemplary system for facilitating radio communication using a targeting device, according to an example embodiment of the present subject matter.

DETAILED DESCRIPTION OF THE INVENTION

The exemplary embodiments described herein in detail for illustrative purposes are subject to many variations in structure and design.

The example technique disclosed herein provides an improved way to operate a communication device (e.g., a radio communication device) which is used in conjunction with targeting devices. Exemplary targeting devices include a sensor, an imager, a rangefinder, a weapon at d the like. In an example embodiment, the targeting device includes a wireless microphone and an activation button so that the communication device can be operated through a fireless link from the targeting device.

Referring now to FIG. 1, which illustrates an exemplary system 100 for facilitating radio communication using a targeting device 102, according to an example embodiment of the present subject matter. Exemplary targeting device includes a sensor, an imager, a rangefinder, a weapon and any other portable hand-held targeting device operated using both hands of an operator. For example, a targeting device is a device that is used in locating/identifying a target object, acquiring target data, designating a target object and/or providing direct fire on a target.

As shown in FIG. 1, the system 100 includes the targeting device 102 and a communication device 112. For example, the communication device 112 is a radio communication device. In one example, a communication device is a device that includes a transceiver to send and receive audio signals via a radio channel. This allows an operator to communicate with other operators using similar communication devices operating on the same radio channel (or radio frequency).

Further as shown in FIG. 1, the targeting device 102 includes a wireless microphone 106 and an activation button 104. Furthermore as shown in FIG. 1, the wireless microphone 106 is wirelessly connected to the communication device 112 via a wireless communication network 110. Exemplary wireless communication network 110 includes Bluetooth and the like. In the example illustrated in FIG. 1, the wireless microphone 106 is disposed near an eyepiece 108 of the targeting device 102 such that the wireless microphone 106 is substantially close to the operator's mouth.

In addition as shown in FIG. 1, the communication device 112 is connected to an audio output device 114. In the example illustrated in FIG. 1, the communication device 112 is connected to the audio output device 114 via a wired link. For example, the communication device 112 can be connected to the audio output device 114 via a wireless link. Exemplary audio output device includes a wireless ear piece, shoulder mounted audio output device, a built-in speaker of the communication device 112 and the like.

Also as shown in FIG. 1, the communication device 112 is connected to one or more other communication devices 118A-N via a radio channel. For example, the communication devices 118A-N are located in a command base and/or weapons platform. In one example, communication devices 118A-N and associated targeting devices in the command base and weapons platform maybe similar to the communication device 112 and the targeting device 102, respectively, shown in FIG. 1.

During a mission, the operator operates the targeting device 102 using both his hands. Further, the operator uses the eyepiece 108 to view a target object. An eyepiece is a lens that is attached to a targeting device through which an operator views a target object. Further, while operating the targeting device 102, the operator may have to communicate with the command base and/or the weapons platform.

To communicate with the command base and/or the weapons platform, the operator pushes the activation button 104 on the targeting device 102 using his finger. In one example, the activation button 104 is accessible to the operator along with other controls buttons on the targeting device 102 which allows the operator to focus on the target object during a mission. The activation button 104 is pressed to instruct the communication device 112 to transmit audio signals in a half-duplex communication mode.

In operation, upon pushing the activation button 104 the communication device 112 is activated. Further, the operator relays an audio message (hereafter referred to as an audio signal). In one example, the wireless microphone 106 obtains and transmits the relayed audio signal to the communication device 112 via the wireless communication network 110. For example, the wireless microphone 106 includes a transmitter that transmits the audio signal to the communication device 112. Further in operation, the communication device 112 transmits the received audio signal to the communication devices 118A-N via the radio channel in the form of radio frequency (RF) signals 116. In one example, the communication devices 118A-N are remotely located in a command base and/or weapons platform.

Furthermore, the operators in the command base and/or weapons platform can communicate back to the operator of the targeting device 102. using respective communication devices 118A-N. In one example, the operators in the command base and/or weapons platform send audio signals to the communication device 112 via the radio channel in the form of RF signals 116. Further, the communication device 112 sends the audio signal received from the communication devices 118A-N to the audio output device 114. Furthermore, the audio output device 114 outputs the received audio signal. In one example, the audio output device 114 is placed substantially close to the operator's ear.

In various embodiments, the system described in FIG. 1 proposes a targeting device including an activation button at d a wireless microphone for facilitating radio communication using the targeting device. The proposed system enables an operator of the targeting device to communicate with the command base and/or weapons platform while both hands of the operator remain on the targeting device. Further, the focus of the operator remains on the target object during communication.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications. as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A system for facilitating radio communication, comprising:
a communication device; and
a hand-held targeting device which is separate and remote from the communication device;
a wireless microphone integrally formed on the hand-held targeting device, wherein the wireless microphone is wirelessly connected to the communication device;
an activation button integrally formed on the hand-held targeting device to activate a link between the communication device and the wireless microphone, wherein the wireless microphone transmits an audio signal to the communication device upon activating the communication device; and
an eyepiece integrally formed on the hand-held targeting device, wherein the wireless microphone is disposed near the eyepiece such that the wireless microphone is substantially in close proximity to an operator's mouth when the operator is viewing a target through the eyepiece such that the operator may focus on the target and simultaneously speak into the wireless microphone.

2. The system of claim 1, wherein the wireless microphone comprises: a transmitter to transmit the audio signal to the communication device upon activating the communication device.

3. The system of claim 1, wherein the communication device is a radio communication device.

4. The system of claim 1, wherein the communication device transmits the received audio signal to one or more other communication devices via a radio channel.

5. The system of claim 4, wherein the one or more other communication devices are located at one of the following locations: a command base and a weapons platform.

6. The system of claim 4, further comprising: an audio output device for outputting an audio signal received from the one or more other communication devices.

7. The system of claim 6, wherein the audio output device is one of a wireless ear piece, shoulder mounted audio output device, and a built-in speaker of the communication device.

8. The system of claim 1, wherein the targeting device is one of a rangefinder and a weapon.

9. A method for a targeting system comprising:
providing a handheld targeting device including an integrally formed wireless microphone, an integrally formed eyepiece, and an integrally formed activation button; wherein the wireless microphone is disposed proximate an operator's mouth when looking through the eyepiece;
grasping the handheld targeting device with at least one hand;
viewing a target through the eyepiece;
actuating the activation button with a finger of the at least one hand while holding the handheld targeting device;
establishing a communication link between the wireless microphone and a communication device remote from the handheld targeting device, wherein the communication link is established after actuating the activation button;
maintaining the target in view through the eyepiece and simultaneously speaking into the microphone positioned proximate the operator's mouth; and
transmitting audio signals from the wireless microphone to the remote communication device along the communication link.

* * * * *